(12) United States Patent
Senga

(10) Patent No.: US 11,383,547 B2
(45) Date of Patent: Jul. 12, 2022

(54) FRICTION BODY, WRITING INSTRUMENT, AND WRITING SET

(71) Applicant: KABUSHIKI KAISHA PILOT CORPORATION, Tokyo (JP)

(72) Inventor: Kuniyuki Senga, Kasugai (JP)

(73) Assignee: KABUSHIKI KAISHA PILOT CORPORATION, Tokyo (JP)

(*) Notice: Subject to any disclaimer, the term of this patent is extended or adjusted under 35 U.S.C. 154(b) by 564 days.

(21) Appl. No.: 16/470,320

(22) PCT Filed: Nov. 29, 2017

(86) PCT No.: PCT/JP2017/042836
§ 371 (c)(1),
(2) Date: Jun. 17, 2019

(87) PCT Pub. No.: WO2018/116767
PCT Pub. Date: Jun. 28, 2018

(65) Prior Publication Data
US 2021/0138826 A1 May 13, 2021

(30) Foreign Application Priority Data

Dec. 19, 2016 (JP) .............................. JP2016-245347

(51) Int. Cl.
| B43K 24/08 | (2006.01) |
| B43K 23/12 | (2006.01) |
| C09D 11/17 | (2014.01) |
| C09D 11/50 | (2014.01) |
| B43K 29/02 | (2006.01) |

(52) U.S. Cl.
CPC ............. *B43K 24/082* (2013.01); *B43K 23/12* (2013.01); *B43K 29/02* (2013.01); *C09D 11/17* (2013.01); *C09D 11/50* (2013.01)

(58) Field of Classification Search
CPC ........ B43K 24/082; B43K 23/12; B43K 29/02
See application file for complete search history.

(56) References Cited

U.S. PATENT DOCUMENTS

2004/0194663 A1* 10/2004 Li ............................. A61K 8/28
106/404
2007/0082977 A1* 4/2007 Shibahashi ............ C09D 11/50
523/161

(Continued)

FOREIGN PATENT DOCUMENTS

| EP | 1118643 | * 7/2001 | ............. C09D 11/50 |
| EP | 2 497 789 | 9/2012 | |

(Continued)

OTHER PUBLICATIONS

Extended European Search Report dated Jun. 22, 2020 in corresponding European Patent Application No. 17882498.3.

(Continued)

*Primary Examiner* — J C Jacyna
(74) *Attorney, Agent, or Firm* — Wenderoth, Lind & Ponack, L.L.P.

(57) ABSTRACT

A friction body is configured to discolor handwriting written with a thermochromic ink with frictional heat. The friction body includes a viscoelastic body, and has a Shore A hardness (based on JIS K 7215) immediately after start of contact of an indenter point of from 55 to 95.

12 Claims, 2 Drawing Sheets

(56) References Cited

U.S. PATENT DOCUMENTS

2007/0189836 A1* 8/2007 Senga .................. B43K 23/12
   401/215
2012/0246880 A1 10/2012 Ootsuka et al.

FOREIGN PATENT DOCUMENTS

| JP | 2004-244489 | 9/2004 |
| JP | 2006-123324 | 5/2006 |
| JP | 2009-143207 | 7/2009 |
| JP | 2009-285927 | 12/2009 |
| JP | 2011-136556 | 7/2011 |
| JP | 2012-82401 | 4/2012 |
| JP | 2013-44919 | 3/2013 |
| JP | 2016-165842 | 9/2016 |

OTHER PUBLICATIONS

International Search Report dated Mar. 6, 2018 in International (PCT) Application No. PCT/JP2017/042836.

International Preliminary Report on Patentability dated Jun. 25, 2019 in International (PCT) Application No. PCT/JP2017/042836, with English translation.

* cited by examiner

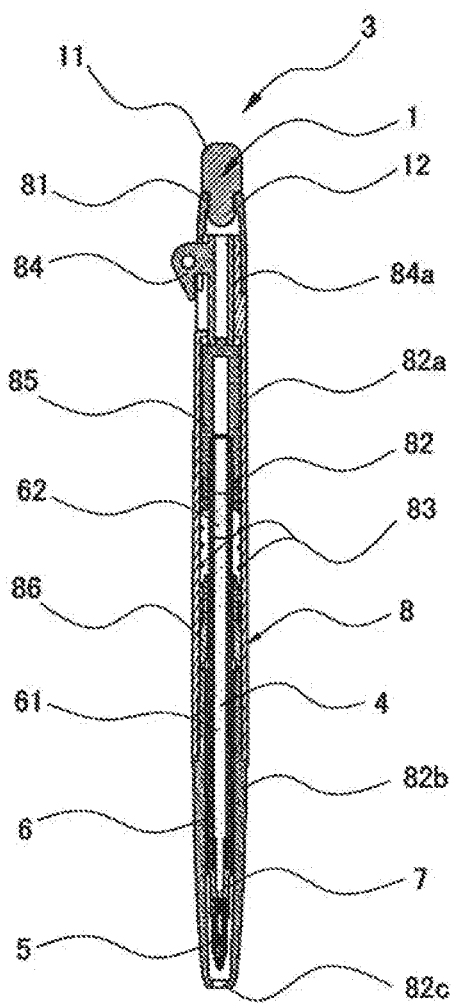
[Fig. 1]

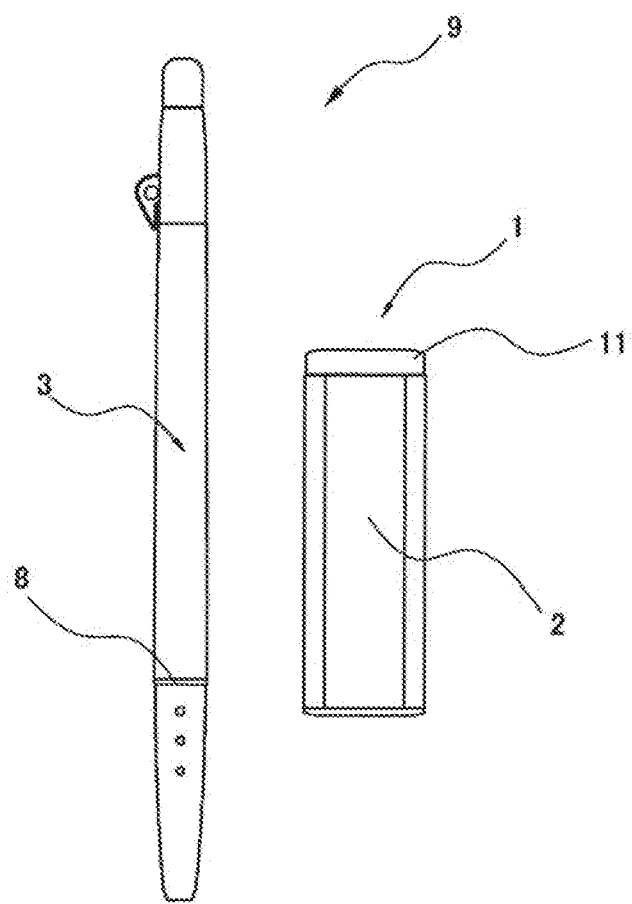
[Fig. 2]

FRICTION BODY, WRITING INSTRUMENT, AND WRITING SET

TECHNICAL FIELD

The present invention relates to a friction body, a writing instrument, and a writing set. More specifically, the present invention relates to a friction body for thermally discoloring handwriting written with a thermochromic ink, a writing instrument including the friction body, and a writing set containing the friction body and the writing instrument.

DESCRIPTION OF THE RELATED ART

Thermochromic writing instruments containing a thermochromic ink and capable of thermally erasing or discoloring handwriting written with the ink have recently been widely used. Such a writing instrument includes a friction body formed from an elastic body to thermally change handwriting formed on paper in a quick and easy manner. Such a friction body is integrally formed with, for example, the rear end of the barrel, the mouth ring, or the cap of the writing instrument, or provided as a separate body, for practical use (refer to, for example, Japanese Patent Application Publications No. 2009-285927, No. 2009-143207, and No. 2011-136556).

The friction bodies described in these patent literatures and currently distributed in the market are elastic bodies. Thus, the color of handwriting written with a current thermally erasable ink, which contains only a thermochromic material to serve as a coloring component, can be chemically erased with frictional heat generated by rubbing the handwriting. However, when a metallic luster pigment is added into a thermochromic ink to produce metallic handwriting, the color of the thermally erasable material is erased by rubbing the handwriting written with the ink, but the metallic luster pigment remains on the handwriting, and thus the handwriting is not recognized as fully erased. Further, the metallic luster pigment scattered on the paper in and around the handwriting impairs the appearance.

SUMMARY OF THE INVENTION

Problem to be Solved by the Invention

The present invention is to solve the problem described above, and aims to provide a novel friction body having both chemical erasability and physical erasability that enable erasing or discoloring of a thermochromic material and removal of a metallic luster pigment simultaneously by rubbing of the handwriting even when the handwriting is written with an ink of a novel combination of a thermochromic ink and a metallic luster pigment added into the thermochromic ink. Further, the present invention aims to provide a highly convenient and practical writing instrument including the friction body that can solve the problem with handwriting written with an ink of the new combination, and ensure sufficient erasability of such handwriting without impairing the appearance when erasing.

Means for Solving the Problem

An essential feature of the present invention is a friction body that discolors handwriting written with a thermochromic ink with frictional heat. The friction body contains a viscoelastic body, and has a Shore A hardness (based on JIS K 7215) immediately after start of contact of an indenter point in the range of from 55 to 90.

Also, the friction body may have a value ($\Delta HS$) defined by the formula using Shore A hardness below of from 5 to 40.

$\Delta HS$=Shore A hardness value immediately after start of contact of an indenter point−Shore A hardness value 15 sec after start of contact of an indenter point The friction body may also contain an $\alpha$-olefin copolymer in the viscoelastic body.

Further, an essential feature of the invention is a writing instrument including any of the friction bodies described above, and containing a thermochromic ink, or a writing set that contains any of the friction bodies described above and a writing instrument containing a thermochromic ink.

The thermochromic ink may further contain a metallic luster pigment. The metallic luster pigment may have an average particle diameter of 10 μm or more. The thermochromic ink may contain a thermochromic microcapsule pigment, and the thermochromic microcapsule pigment may have an average particle diameter of 2 μm or more.

Effect of the Invention

The present invention can provide a novel friction body having both chemical erasability and physical erasability that enable erasing or discoloring of a thermochromic material and removal of particles simultaneously by rubbing handwriting written even with an ink of a novel combination of a thermochromic ink and particles of, for example, a metallic luster pigment added into the thermochromic ink.

BRIEF DESCRIPTION OF DRAWINGS

FIG. 1 is a longitudinal sectional view of an Example of a writing instrument including a friction body;

FIG. 2 is an external view of an Example of a writing set containing a friction body and a thermochromic writing instrument.

DETAILED DESCRIPTION OF THE INVENTION

As used herein, "top" and "front" indicates the direction of the contact section of the friction body with handwriting, and "lower" and "rear" indicates the other side. In the writing instrument, "front" means the pen tip side and "rear" means the barrel side. For the amount of each component contained in a composition, when a plurality of substances corresponding to the component are present in the composition, the amount of the component means the total amount of the corresponding substances present in the composition unless otherwise specified.

Friction Body

The friction body contains a viscoelastic body, and has a Shore A hardness (based on JIS K 7215) immediately after start of contact of an indenter point in the range of from 55 to 95. Like conventional friction bodies, the friction body is used to erase or discolor handwriting written with a thermochromic ink with frictional heat generated by rubbing of the handwriting. At this time, the friction body generates frictional heat by acting as an elastic body, and also exhibits an adsorption removal capability by acting as a viscous body. Thus, the friction body alone have both chemical and physical erasabilities.

When erasing, a writing instrument and a writing set including the friction body can ensure sufficient erasability of handwriting written even with an ink of the novel combination without impairing the appearance by leaving the color partially unerased in and around the handwriting. Thus, the writing instrument and the writing set including the friction body is highly convenient and practical. The friction body can be formed using a single member like a friction body included in a conventional writing instrument, and thus the external package of the writing instrument can be used as it is as the friction body, which is highly versatile. In addition, the friction body can exhibit a similar action to a conventional eraser, and thus, for example, the friction body can remove black lead on paper. Thus, the friction body alone can serve as a new erasing instrument that can thermally discolor a thermochromic ink, and remove handwriting written with, for example, a pencil lead or a mechanical pencil lead.

A viscoelastic body contains a material having properties of a viscous body and an elastic body. Typically, a viscous body is deformed by an external force and remains deformed even after removal of the external force, whereas an elastic body is deformed by an external force, but restores its original shape after removal of the external force. Whether a material is a viscoelastic body or rather close to a viscous body or an elastic body can be determined by observing, for example, the time of stress relaxation (change in stress with time) when a given strain is applied to the material. If the relaxation time is sufficiently short relative to the observation time scale, the material is a viscous body, if the relaxation time is long, the material is an elastic body, and if the time is about the same scale, the material is a viscoelastic body. Specifically, for example, in the measurement of Shore A hardness, if the difference obtained by subtracting a Shore A hardness value 15 see after start of contact of an indenter point from a Shore A hardness value immediately after start of contact of an indenter point is from 5 to 40, the material is a viscoelastic body as used in the present invention.

Although the viscoelastic body is not particularly limited, for example, a high polymer material, such as a rubber component, a resin component, or an elastomer component can be used, and various components may be added as appropriate. In particular, a viscoelastic body mainly composed of a highly viscous α-olefin copolymer composition obtained by adding a paraffinic oil to an α-olefin copolymer is preferable. Specifically, a resin composition obtained by melt-mixing a polystyrene elastomer and an olefin elastomer, which are elastic bodies, and further crystalline polyolefin, which is less elastic, to the viscous α-olefin copolymer composition, or a main component, as appropriate, and adjusting its viscoelasticity is preferable as a material of the friction body. The mixing ratio of these components can be selected in accordance with the processability in, for example, molding, frictional heat generation efficiency, and removability of pigment particles.

In particular, in Shore A hardness based on JIS K 7215, the friction body has a value (ΔHS) defined by ΔHS=Shore A hardness value immediately after start of contact of an indenter point−Shore A hardness value 15 see after start of contact of an indenter point of, for example, from 5 to 40, preferably from 10 to 30, and more preferably from 15 to 25. When the value is not greater than the upper limit, frictional heat is further efficiently generated through rubbing of handwriting on paper. When the value is not less than the lower limit, particle substances (pigment) can be more easily adsorbed and removed. For high polymer materials, the ΔHS can be changed in any manner in accordance with the comonomer type or the comonomer composition. Also, the ΔHS can be set in any manner by mixing a plurality of comonomers.

Further, the friction body has a Shore A hardness (based on JIS K 7215) immediately after start of contact of an indenter point in the range of from 55 to 95, preferably 70 or more, and more preferably 80 or more. The friction body having a Shore A hardness (based on JIS K 7215) immediately after start of contact of an indenter point of not less than the lower limit has a particularly high frictional heat generation efficiency, and can easily thermally discolor handwriting, and thus is more preferable. A Shore A hardness may be a value converted from a measured Shore D hardness.

The α-olefin copolymer forming the friction body contains building blocks derived from, for example, at least two α-olefins selected from α-olefins having a carbon atom number of 2 to 20. α-Olefins forming the copolymer includes, for example, 4-methyl-1-pentene and at least one α-olefin other than 4-methyl-1-pentene. Examples of the α-olefin other than 4-methyl-1-pentene include ethylene, propylene, 1-butene, 1-hexene, 3-methyl-1-butene, 3-methyl-1-pentene, 1-octene, 1-decene, 1-undecene, 1-dodecene, 1-tetradecene, 1-hexadecene, 1-octadecene, 1-eicosene, norbornene, 5-methyl-2-norbornene, tetracyclododecene, 5-vinylidene-2-norbornene, and 5-ethylidene-2-norbornene, and at least one of ethylene and propylene is preferably contained. The α-olefin copolymer can contain, for example, building blocks derived from 5 mol % to 95 mol % of 4-methyl-1-pentene, and 5 mol % to 95 mol % of building blocks derived from α-olefins other than 4-methyl-1-pentene. The α-olefin copolymer may further contain building blocks derived from 10 mol % or less disconjugate polyene.

The α-olefin copolymer has a limiting viscosity (dL/g) in decalin at 135° C. of, for example, from 0.01 dL/g to 5 dL/g, and preferably from 0.5 dL/g to 2.5 dL/g. Also, the α-olefin copolymer has a ratio of weight-average molecular weight (Mw) to number-average molecular weight (Mn), or (Mw/Mn), of, for example, from 1 to 3.5, and preferably from 1.5 to 2.5. The weight-average molecular weight (Mw) is, for example, from 1,000 to 2,500,000. The weight-average molecular weight (Mw) and the number-average molecular weight (Mn) of the α-olefin copolymer are polystyrene equivalents measured using gel permeation chromatography (GPC).

The friction body may be formed from a resin composition containing the α-olefin copolymer. The resin composition may contain, in addition to the α-olefin copolymer, for example, additives such as a weathering stabilizer, a heat stabilizer, a plasticizer, a softener, and a processing aid. Examples of the softener include petroleum substances, such as process oil, polyethylene wax, and paraffinic oil; coal tars; fatty oils; waxes; and ester plasticizers.

Preferably, the resin composition containing the α-olefin copolymer further contains at least one thermoplastic resin in view of mechanical properties. The resin composition can contain, for example, 5 parts by weight to 49 parts by weight of the α-olefin copolymer, and 51 parts by weight to 95 parts by weight of a thermoplastic resin. Example of the thermoplastic resin include polyolefin resin, polyamide resin, polyester resin, vinyl aromatic resin, and polyurethane copolymer rubber. Examples of the polyolefin resin include low density, medium density, high density polyethylene, high pressure low density polyethylene, isotactic polypropylene, syndiotactic polypropylene, poly 1-butene, poly 4-methyl- 1-pentene, poly 3-methyl-1-butene, ethylene•α-olefin copolymer, propylene•α-olefin copolymer, 1-butene•α-olefin copolymer, cyclic olefin copolymer, and chlorinated polyolefin. Examples of the vinyl aromatic resin include polystyrene, ABS resin, AS resin, and styrene elastomers (styrene-butadiene-styrene block polymers, styrene-isoprene-styrene block polymers, styrene-isobutylene-styrene block polymers, and hydrogen added polystyrene). For the details of the resin composition containing the α-olefin copolymer, for example, International Patent Publication No. WO 2011/05503 can be referred to produce a resin composition having a desired Shore A hardness and ΔHS.

The friction body is shaped into a form capable of rubbing handwriting for practical use. The friction body is provided either alone or with another member, such as hard resin, in any graspable shape that allows the friction area to contact handwriting (paper surface). In addition, the friction body can be formed together with a thermochromic writing instrument containing a thermochromic ink, or in a writing set containing a thermochromic ink-containing writing instrument and the friction body separately.

Thermochromic Writing Instrument

Any writing instrument containing a thermochromic ink, whether water-based or oil-based, and capable of forming thermochromic handwriting may be used with the friction body. A thermochromic ink according to the present invention refers collectively to materials that form handwriting, including pencil lead. The details will now be described.

Any conventional widely-used thermally erasable or discolorable ink can be used for the thermochromic ink to be contained in the writing instrument. A preferable example of the coloring agent to be mixed in the ink is a reversible thermochromic composition containing at least three indispensable components: an electron-donating color-reactive organic compound, an electron-accepting compound, and a reactive medium that determines a temperature that causes a color development reaction between the two compounds. In particular, a microcapsule pigment microencapsulating a reversible thermochromic composition is effective.

Examples of the reversible thermochromic composition include those described in, for example, Japanese published examined applications No. Sho 51-44706, No. Sho 51-44707, and No. Hei 1-29398. These compositions change colors before and after a predetermined temperature (discolor point), the color turns into an erased state in a high temperature region of temperatures greater than or equal to the discolor point, and the color turns into a colored state in a low temperature region of temperatures lower than or equal to the discolor point. Of these two states, a particular state alone can exist in normal temperature region. Although the other state is maintained while hotness or coldness necessary for developing that state is applied, once the hotness or coldness ceases to be applied, the state goes back to a state presented in normal temperature region. Thus, the reversible thermochromic compositions have a relatively small hysteresis width (ΔH is from 1° C. to 7° C.). A thermally erasable microcapsule pigment microencapsulating such a composition can be applied.

Further, examples of the reversible thermochromic composition include those described in Japanese published examined applications No. Hei 4-17154, No. Hei 7-179777, No. Hei 7-33997, and No. Hei 8-39936, which have a relatively large hysteretic property (ΔH value of 8° C. to 50° C.), and those described in Japanese Patent Application Publications No. 2006-137886, No. 2006-188660, No. 2008-45062, and No. 2008-280523, which have a large hysteretic property. A large hysteretic property means that a curved line obtained by plotting changes in color density due to temperature change differ largely in shape between the path through which the temperature is increased from temperatures lower than a discolor temperature region and the path through which the temperature is decreased from temperatures higher than the discolor temperature region. Such a reversible thermochromic composition has a color-retention property of maintaining a colored state in a low temperature region lower than or equal to a complete-color-developing temperature, or an erased state in a temperature region higher than or equal to a complete-discoloring-temperature, each in a specific temperature region. A thermally erasable microcapsule pigment containing such a composition can also be applied.

Specific examples of the reversible thermochromic composition having the color-retention property include those having a complete-color-developing temperature specified to temperatures only reachable, for example, in a freezer or a cold region, or from −50° C. to 0° C., preferably from −40° C. to −5° C., and more preferably from −30° C. to −10° C., and a complete-discoloring-temperature specified to temperatures obtained by frictional heat with the friction body, or from 50° C. to 95° C., preferably from 50° C. to 90° C., and more preferably from 60° C. to 80° C., and a ΔH value specified to from 40° C. to 100° C., and thus effectively functioning in maintaining colors developed at normal state (temperature range of normal life).

When the microcapsule pigment is used, the microcapsule pigment preferably has an average particle diameter in the range of, for example, from 0.05 μm to 5.0 μm, preferably from 0.1 μm to 4.0 μm, and more preferably from 0.5 μm to 3.0 μm in view of writing performance and handwriting density. When the microcapsule pigment is set to have an average particle diameter of 2.0 μm or more in order to further effectively exhibit the erasability of the friction body of the present invention, both chemical erasability through frictional heat and physical erasability through adsorption removal become possible, and thus the microcapsule pigment is highly effective in irreversible erasing and discoloring. An average particle diameter is a value obtained by determining a particle region using a software for particle size distribution measurement through image analysis, "Mac-View" by Mountech, calculating the diameter of a circle that has the same area as the projected area (Heywood diameter) from the area of the particle region, and measuring the average particle diameter of particles of equal volume sphere equivalent based on the value.

When all the particles or most of the particles have a particle diameter exceeding 0.2 μm, the average particle diameter can also be measured as an average particle diameter of particles of equal volume sphere equivalent by coulter method using a particle size distribution measurement device (trade name: Multisizer 4e by Beckman Coulter).

Further, to impart to handwriting a desired hue that is not subject to thermal discoloration, for example, a dye or an ordinary pigment may be used as a coloring agent component. Examples of the dye include acid dyes, basic dyes, and direct dyes. Examples of the ordinary pigment include inorganic pigments, such as carbon black and ultramarine; organic pigments, such as copper phthalocyanine blue and benzidine yellow; and dispersed pigment products where pigments are finely and stably pre-dispersed in a medium using, for example, a surfactant. Other examples of applicable pigments include specific pigments, such as metallic luster pigments, such as metal powder and pearl pigments; fluorescent pigments, phosphorescent pigments, and titanium dioxide. These coloring components may be used in combination with the microcapsule pigments described above, or can be microencapsulated in the microcapsule pigments.

In particular, a metallic luster pigment added to a thermochromic ink forms a metallic ink, which produces shiny decorative handwriting at writing, and is more useful. When the above-described thermochromic microcapsule pigment is used as a coloring agent, a transparent metallic luster pigment is usefully added, because the thermochromic microcapsule pigment becomes transparent and visually recognized as having been completely erased without leaving any shininess.

To erase the handwriting, thermal discoloration and separation removal are necessary. Thus, two types of friction bodies, or a friction body formed from an elastic body with a large shore hardness, and a friction body formed from an elastic body with a small shore hardness have so far been used. However, the friction body according to the present invention enables erasing (discoloring) of the color with frictional heat and adsorption removal with one rubbing, and thus is highly convenient. In particular, a metallic luster pigment having an average particle diameter of 10 µm or more enables shiny handwriting and easier adsorption removal, and thus is highly effective in decorative handwriting and irreversible erasing.

Examples of the transparent metallic luster pigment include shiny pigments containing a core substance formed from a material selected from natural mica, synthetic mica, flat glass chips, and aluminum oxide flakes, and a metal oxide coating the core substance, and cholesteric liquid crystal shiny pigments.

Among the shiny pigments having a core substance formed from natural mica, for example, those coated with titanium oxide on the surface, and those further coated with iron oxide or a non-thermochromic dye or pigment on the titanium oxide are effective. Specific examples include "Iriodin" (trade name) by Merck, and "Lumina colors" (trade name) by Engelhard.

Among the shiny pigments having a core substance formed from synthetic mica, those coated with a metal oxide such as titanium oxide on the surface are effective. Examples of the metal oxide include titanium, zirconium, chromium, vanadium, and iron. Preferred examples are metal oxides containing titanium oxide as a main component. A specific example is "ULTIMICA" (trade name) by Nihon Koken Kogyo.

Among the shiny pigments having a core substance formed from flat glass chips, for example, those coated with a metal oxide such as titanium oxide on the surface are effective. A specific example is "Metashine" (trade name) by Nippon Sheet Glass.

Among the shiny pigment having a core substance formed from aluminum oxide flakes, those coated with a metal oxide such as titanium oxide on the surface are effective. Examples of the metal oxide include titanium, zirconium, chromium, vanadium, and iron. Preferred examples are metal oxides containing titanium oxide as a main component. A specific example is "Xirallic" (trade name) by Merck.

Liquid crystal polymers used as a cholesteric liquid crystal shiny pigment reflect light of only a partial region among light entering in a wide spectral region due to light interference effect, and allow all the light entering in other regions to pass through. The liquid crystal polymers have a superior metal luster and a color flop property, where a change in viewing angle causes a change in hue, and also have transparency. A specific example of the cholesteric liquid crystal shiny pigment is "Helicone HC" (trade name) by Wacker Chemie.

A shiny material may be obtained by vacuum-depositing a metal such as gold or silver on a film, peeling off the metal foil, and finely-pulverizing the foil. An example of such a shiny material is "Elgee neo" by Oike.

The metallic luster pigment has an average particle diameter of from 0.1 µm to 50 µm, preferably from 2 µm to 40 µm, and more preferably from 10 µm to 40 µm in view of writing performance and luminance. An average particle diameter is obtained by measuring a particle diameter distribution using a laser diffraction/scattering particle diameter distribution measuring device (LA-300 by Horiba), and calculating an average particle diameter (median diameter) on a volumetric basis based on the numerical value.

In particular, those having an average particle diameter of 10 µm or more have an extremely high luminance, but not easily penetrate into paper at writing. Thus, the pigment tends to scatter when rubbed with a conventional friction body formed from an elastic body, and the metallic luster pigment scattered across the rubbed area can be visually recognized from certain angles, which can impair the appearance. In particular, high luster is emphasized on black paper, and thus the appearance is further impaired. In contrast, the friction body formed from a viscoelastic body can adsorb and remove the metallic luster pigment by rubbing without scattering the pigment in the rubbed area, and thus erase the handwriting completely. The viscoelastic friction body can erase (discolor) the color of handwriting written with a thermochromic ink with metal luster by chemical erasing with frictional heat and by physical erasing through adsorption removal, and thus is highly effective in irreversible erasing and discoloring.

To the thermochromic ink, various additives may be added as appropriate. To a water-based ink, conventionally used additives such as a pH adjuster, an antirust agent, an antiseptic agent or a mildewproofing agent, a wetting agent, an antifoamer, a surfactant, a lubricant, a fixing agent such as resin, a shear-thinning tackifier, a pen tip anti-drying agent, and an anti-sagging agent can be added. To an oil-based ink, conventionally used additives such as a viscosity control agent, an antiseptic agent, an antirust agent, an antifoamer, a lubricant, a dispersant, an anti-faint writing agent, an anti-leak agent, and a surfactant can be added.

Examples of the writing instrument containing the thermochromic ink includes a fountain pen, a marking pen, a ballpoint pen, and an unwinding type solid writing instrument. The writing instrument may be a cap type having a cap to cover the pen tip, or a retractable type having, for example, a knocking, twisting, or sliding type pen-tip retractable mechanism where the pen tip is containable in the barrel. In the pen-tip retractable type, the writing instrument may contain not only a single refill but also two or more refills (multiple type). In the multiple type, a desired refill can be selectively retracted. Also, the writing instrument can be a two-tip type including different pen tips, or pen tips that draw out inks different in hue.

Examples of the marking pen include those having a structure where a marking pen tip, such as a fiber tip, a felt tip, a plastic tip, or a metal tip is attached to its writing tip section, and an ink absorption body composed of a fiber bundle and contained in the barrel is impregnated with ink, from which ink is supplied to the writing tip section; a structure where ink is directly contained in the barrel, and a predetermined amount of ink is supplied to the writing tip section via an ink flow rate-controlling member having comb-like grooves or composed of a fiber bundle; and a structure where ink is directly contained in the barrel, and a predetermined amount of ink is supplied to the writing tip section using a valve system.

Examples of the ballpoint pen include those having a structure including an ink-containing tube charged with an ink composition in the barrel and communicating with a tip with a ball mounted on its tip section, and an ink backflow preventer being in close contact with an ink end face; a structure where a tip is connected to the tip end of the barrel, an ink composition is directly filled in the barrel, and an ink backflow preventer is in close contact with an ink end face; a structure where an ink absorption body composed of a fiber bundle and contained in the barrel is impregnated with ink, from which ink is supplied to the tip; and a structure including an ink flow rate-controlling member with comb-like grooves, or composed of a fiber bundle, through which a predetermined amount of ink is supplied to the tip.

The friction body of the thermochromic writing instrument is integrally formed with the exterior package or formed separately (i.e., in a writing set), and has a structure that enables its friction surface to contact handwriting (paper surface). Specifically, examples of the exterior package include a cap, a clip, a clasp, a ring, a barrel, a tail valve, a grip, and a knock member (press member for a retractable mechanism). Further, the writing instrument may have a structure where the friction body is covered with a cover member to prevent the friction body from being soiled during storage. When provided separately, the friction body may be composed of a viscoelastic body alone, or formed together with a hard material.

EXAMPLES

Examples of the present invention will now be described with reference to the attached drawings. The numerical values for the composition indicate parts by mass. The average diameter of a thermochromic pigment is a value obtained from measurement of an equivalent diameter of an equal volume sphere measured by coulter method using a particle size distribution measurement device (trade name: Multisizer 4e by Beckman Coulter). The average particle diameter of a metallic luster pigment is the median value of a particle diameter distribution on a volumetric basis measured using a laser particle diameter distribution measuring machine: LA-300 by Horiba. A Shore A hardness is a value obtained by pressure measurement based on IS K 7215 using a manual press durometer.

FIG. 1 is a view of an example of a thermochromic writing instrument according to the present invention, and FIG. 2 is a view of an example of a writing set containing the friction body and the thermochromic writing instrument.

Embodiment 1 (Refer to FIG. 1)

Example 1

A milk white friction body 1 having a curbed surface to serve as a handwriting contact portion 11 at its front and a locking portion at its rear was obtained by injection molding a pellet mixture containing a viscoelastic polyolefin elastomer obtained by adding a paraffinic oil to an α-olefin copolymer, a styrene elastomer, and a crystalline polypropylene into a stepped cylindrical shape.

The resultant friction body 1 had a Shore A hardness immediately after start of contact of an indenter point of 85, and 15 sec after start of contact of an indenter point of 60, and a value defined by formula below (ΔHS) was 25.

$\Delta HS$=Shore A hardness value immediately after start of contact of an indenter point−Shore A hardness value 15 sec after start of contact of an indenter point.

The upper edge of the friction body 1 was rounded off to form the handwriting contact portion (friction area 11) having a structure that allows easy and stable friction through rubbing when rubbing handwriting (paper surface).

The resultant friction body 1 was fitted into a locking hole 81 provided at the rear end of a retractable type writing instrument barrel 82 to complete a thermochromic writing instrument 3 of FIG. 1. The retractable mechanism of the writing instrument barrel 82 is driven by press-sliding operation of an operation portion 84, which rotates a rotating cam to retract a pen tip 5 of a writing instrument refill 4 accommodated in the barrel 82. Thus, the thermochromic writing instrument 3 includes a writing instrument body 8 and the friction body 1 fitted into the locking hole 81 of the writing instrument body 8.

Specifically, the barrel 82 includes a front barrel 82b in the form of a cylindrical body, through which an end opening 82c for retracting the pen tip (ballpoint pen tip) 5 of the writing instrument refill 4 is axially provided, and a cylindrical rear barrel 82a screwed together with the rear end portion of the front barrel 82b. The barrel 82 houses a retractable mechanism. The rear barrel 82a includes two longitudinally dividable members into which a slidable body 84a is attached. The rear barrel 82a also have a plurality of equally spaced axial grooves around its inner circumference for guiding the rotating cam. The rear barrel 82a has a rear side wall (i.e., dividable area) with a longitudinally extending slit-like window hole, into which an operation section 84 of the slidable body 84a is inserted in a manner to protrude outward from the window hole.

A refill holding section 85 is disposed forward of the slidable body 84a, and is connected to the refill 4. The refill 4 includes the ballpoint pen tip 5, which holds a ball in a rotatable manner at its front end, and an ink containing tube 6 being formed from a metal pipe, which includes the ballpoint pen tip 5 at its front end, and having an open rear end. The tip 5 and the ink containing tube 6 are connected via a transparent resin connecting member 7.

The slidable body 84a is a resin molded product including the operation section 84 protruding outward from the window hole, and a plurality of saw-toothed protrusions at its end. Sliding (pressing) operation of the operation section 84 moves the refill holding section 85 (rotating cam) forward, and the saw-toothed protrusions induce its rotation. Thus, moving the operation section 84 forward allows the pen tip 5 of the refill 4 to protrude from the end opening 82c.

The refill holding section 85 disposed forward of the slidable body 84a is a connection member into which the refill 4 is inserted. Also, the refill holding section 85 acts as a rotating cam of the retractable mechanism.

The refill holding section 85 is a substantially cylindrical resin molded product including steps, at its rear end, engageable with the saw-toothed protrusions arranged at the front end of the slidable body, and having an insertion hole substantially at its center in its forward section, into which the refill 4 is press-fit. The refill holding section 85 also has a plurality of circumferentially equally-spaced ribs on its cylindrical external surface, which are included in the rotating cam mechanism (not shown).

Further, on its front edge, steps are formed around its outer circumference, and the steps lock the rear end of a resilient member 83, which is formed from a compressed coil spring. The front end of the resilient member 83 is locked by a resin lock member 86 fixed to the barrel. Thus, the refill holding section 85 is pressed backward by the resilient member 83, which, together with the rotating cam mechanism including the outer circumference of the refill holding section 85 and the inner surface of the barrel, forms a retractable writing instrument structure.

At the top of the rear barrel 82a (rear end of the dividable area), a locking hole 81 in the form of an axial through hole is provided as a friction body-mount. The locking hole 81 has two ring beads formed on the inner wall surface near the opening, which allow the lower side of the friction body 1 to be press-fit when inserted, and further locked by a locking part 12. This structure prevents the friction body 1 from easily coming off in use, while allowing the friction body 1 to be pulled out for replacement.

The refill 4 contains a thermochromic ink composition 61 and an ink follower composition 62.

A specific example of the ink 61 is a metal luster thermochromic water-color ink composition containing 11 parts of a reversible thermochromic pigment micro-encapsulating a reversible thermochromic composition (color developing temperature: −10° C., color erasing temperature: 65° C., average particle diameter: 2.5 μm, changes color from pink to colorless); 3 parts of a transparent metallic luster pigment (trade name: Iriodin 6103 Icy White by Merck, average particle diameter: 25 μm, silver color) obtained by coating synthetic mica surface with a metal oxide; 2 parts of a metal deposition resin pigment (trade name: Elgee neo silver #325 by Oike, average particle diameter 35 μm, silver color); 0.3 parts of shear-thinning tackifier (xanthane gum); 10 parts of urea; 10 parts of glycerol; 0.6 parts of nonionic permeability imparting agent (trade name: SN Wet 366 by San Nopco); 0.1 part of hydrophobic silica antifoamer (trade name: Nopco 8034 by San Nopco); parts of preservative (trade name: Proxel XL-2 by Lonza Japan); and 62.9 parts of water.

A specific example of the ink follower 62 is obtained by adding 1.5 parts of aliphatic acid amide, or a thickener, to 98.5 parts of polybutene, or a base oil, and then kneading the mixture with a triple roll mill.

When writing with the thus structured thermochromic writing instrument 3, press-sliding the operation section 84 of the slidable body 84a forward moves the refill holding section 85, which also acts as a rotating cam, forward to be held in a rotated position, and thus the pen tip 5 of the writing instrument refill 4 fitted in the forefront of the refill holding section 85 is held protruding from the end opening 82c to enable writing.

Handwriting formed on paper surface (writing paper A) in this state with the ink 61 showed a metallic pink color where the silver colored shiny pigment is dispersed in the pink-colored handwriting written with the thermochromic pigment. When written on black paper, handwriting with a similar hue but a particularly high shininess was obtained.

Each of the handwriting above is erasable with the attached friction body 1.

Specifically, rubbing handwriting repeatedly with the friction area 11 allows the friction body 1 to exert its ability as an elastic body, and generates frictional heat, which makes the thermochromic pigment transparent. At the same time, the friction body 1 also acts as a viscous body, and adsorbs and removes the shiny pigment from the paper surface. Thus, without soiling the paper surface, handwriting is completely erased. When a shiny pigment remains on black paper, the shininess is recognizable regardless of viewing angle. Thus, use of the friction body 1 according to the present invention is particularly useful on black paper.

Table 1 shows the respective hardnesses and test results of the friction body 1 of Example 1 described above and the friction bodies 1 of other Examples 2 to 7 as well as the friction bodies of Comparative Examples (erasers for Comparative Examples 3 and 4).

Any of the friction bodies of Example 1 to 7 is a mixture of an α-polyolefin copolymer, an olefin or styrene elastomer, and a crystalline polyolefin. For example, the friction body of Example 6 contains an α-polyolefin copolymer in an amount of 40%, a styrene elastomer in an amount of 40%, and a crystalline polypropylene in an amount of 20%. Comparative Example 1 is a styrene elastomer (AR-885C by Aronkasi), Comparative Example 2 is a polyester elastomer (B1910N by Mitsubishi Chemical), and Comparative Examples 3 and 4 are commercial vinyl chloride erasers (Comparative Example 3 by Pentel, Comparative Example 4 by Pilot).

TABLE 1

|  |  | Example | | | | | | | Comparative Example | | | |
| --- | --- | --- | --- | --- | --- | --- | --- | --- | --- | --- | --- | --- |
|  |  | 1 | 2 | 3 | 4 | 5 | 6 | 7 | 1 | 2 | 3 | 4 |
| Shore A hardness | immediately after | 85 | 80 | 60 | 85 | 85 | 90 | 91 | 88 | 95 | 54 | 50 |
|  | 15 sec after | 60 | 60 | 38 | 70 | 75 | 72 | 80 | 88 | 95 | 24 | 25 |
|  | ΔHS | 25 | 20 | 22 | 15 | 10 | 18 | 11 | 0 | 0 | 30 | 25 |
| Erasability test | White paper | A | A | A | A | A | A | A | C | C | B | B |
|  | Black paper | A | A | A | A | A | A | A | C | C | C | C |
| Generation of crumbs |  | A | A | B | A | A | A | A | A | A | C | C |

The test method using handwriting written with the ballpoint pen as in Example 1 is described below.

Erasability Test

Ten spiral circles were continuously hand-written with the ballpoint pen on white writing paper A and black paper (thickness: 0.09 mm, weight per unit: 80 g/m2), and then the handwriting on each paper was rubbed with the friction body 1 to erase the color. The results were visually inspected.

Further, generation of crumbs from the friction body after the rubbing was checked.

Evaluations of the test results are as follows.

Erasability Test

A: Handwriting was erased without leaving any color.

B: Thermochromic handwriting or metal luster handwriting was slightly left.

C: Thermochromic handwriting or metal luster handwriting (pigment) was not erased.

Generation of Crumbs

A: Not practically problematic.

B: The surface was abraded, and the crumbs adhered to the friction body to the extent practically problematic.

C: A large amount of crumbs generated (eraser crumbs) to the extent practically problematic.

Embodiment 2 (Refer to FIG. 2)

The materials used in Examples and Comparative Examples 1 and 2 of Embodiment 1 were injection-molded into a substantially elliptical plate shape, and fitted into an end of a substantially elliptical cylinder support 2 formed from hard PP resin to form the friction body 1.

Further, a metallic luster thermochromic water-color ink composition 61 was prepared in the same manner except that the reversible thermochromic pigment was changed to a reversible thermochromic pigment having a hue changing from blue to colorless, and the transparent metallic luster pigment was changed to Iriodin 6107 (trade name) by Merck (average particle diameter: 25 μm, silver color).

The resultant ink composition 61 was contained in the writing instrument body 8 (in the refill 4) of Embodiment 1 to complete a retractable type thermochromic writing instrument 3.

Handwriting with the ink 61 on white paper showed metallic blue color where a silver colored shiny pigment was dispersed in blue colored handwriting written with the thermochromic pigment. When written on black paper, handwriting with a similar hue but a particularly high shininess was obtained.

A writing set 9 containing the friction body 1 and the thermochromic writing instrument 3 was prepared.

Handwriting was written with the writing instrument 3 of the writing set 9 on white writing paper A and black paper, and each handwriting was then rubbed with the friction body 1 as in Embodiment 1. The results were the same as those of Examples 1 to 7 and Comparative Examples 1 and 2 shown in Table 1.

Specific results of the erasability test shows that repeatedly rubbing handwriting with the friction area 11 allows the friction body 1 to exert its ability as an elastic body and generate frictional heat, which makes the thermochromic pigment transparent. At the same time, the friction body 1 also acts as a viscous body, and adsorbs and removes the shiny pigment from the paper surface. Thus, without soiling the paper surface, handwriting is completely erased. When a shiny pigment remains on black paper, the shininess is recognizable regardless of viewing angle. Thus, use of the friction body 1 according to the present invention is particularly useful on black paper.

Reference Test

A test below was carried out for handwriting written with commercial pencils using the friction bodies of Embodiment 2 and erasers of Comparative Examples 3 and 4.

Pencil Erasing Test

Ten spiral circles were continuously handwritten with a commercial pencil (8900-B by Tombow) on writing paper A, and then the handwriting was rubbed and erased with the respective friction bodies. The results were visually inspected. Further, generation of crumbs from the friction bodies after the rubbing was checked.

Test results are shown below.

TABLE 2

|  | Example | | | | | | | Comparative Example | | | |
| --- | --- | --- | --- | --- | --- | --- | --- | --- | --- | --- | --- |
|  | 1 | 2 | 3 | 4 | 5 | 6 | 7 | 1 | 2 | 3 | 4 |
| Pencil erasability test | A | A | A | A | A | A | A | C | C | A | A |
| Generation of crumbs | A | A | B | A | A | A | A | A | C | C | |

Evaluations of the test results are as follows.

Pencil Erasing Test

A: Handwriting was erased without leaving any color.

C: Black lead was scattered on handwriting surface and soiled in and around handwriting, or handwriting was not erased.

Generation of Crumbs

A: Not practically problematic.

B: The surface was abraded and the crumbs adhered to the friction body to the extent practically problematic.

C: A large amount of crumbs generated (eraser crumbs) to the extent practically problematic.

Japanese Patent Application Publication No. 2016-245347 (filed on Dec. 19, 2016) is incorporated herein in its entirety by reference. The literature, patent applications, and technical standards described herein are incorporated herein by reference to the same extent as each of them is specifically and individually described as being incorporated herein.

The invention claimed is:

1. A friction body configured to discolor handwriting written with a thermochromic ink with frictional heat, the friction body comprising a viscoelastic body, wherein the friction body has a Shore A hardness of 55 to 95 immediately after a start of contact of an indenter point of a durometer, and
    wherein the friction body has a ΔHS value of 5 to 40, where the ΔHS value is a difference between the Shore A hardness immediately after the start of contact of the indenter point and a Shore A hardness 15 seconds after the start of contact of the indenter point.

2. The friction body according to claim 1, wherein the viscoelastic body contains an α-olefin copolymer.

3. A writing tool including the friction body according to claim 1, and containing a thermochromic ink.

4. The writing tool according to claim 3, wherein the thermochromic ink contains a metallic luster pigment.

5. The writing tool according to claim 4, wherein the metallic luster pigment has an average particle diameter of 10 μm or more.

6. The writing tool according to claim 3, wherein the thermochromic ink contains a thermochromic microcapsule pigment.

7. The writing tool according to claim 6, wherein the thermochromic microcapsule pigment has an average particle diameter of 2 μm or more.

8. A writing set including the friction body according to claim 1 and a writing tool containing a thermochromic ink.

9. The writing set according to claim 8, wherein the thermochromic ink contains a metallic luster pigment.

10. The writing set according to claim 9, wherein the metallic luster pigment has an average particle diameter of 10 μm or more.

11. The writing set according to claim 8, wherein the thermochromic ink contains a thermochromic microcapsule pigment.

12. The writing set according to claim 11, wherein the thermochromic microcapsule pigment has an average particle diameter of 2 μm or more.

* * * * *